United States Patent [19]

Rog

[11] Patent Number: 5,599,096
[45] Date of Patent: Feb. 4, 1997

[54] DISC SCREW EXTRUDER WITH FREE-FLOATING OPERATING MEMBER

[76] Inventor: Aleksandr Rog, 50 Ardmore Rd., West Hartford, Conn. 06119

[21] Appl. No.: 610,219

[22] Filed: Mar. 4, 1996

[51] Int. Cl.⁶ ............................................. B29B 7/42
[52] U.S. Cl. ............................. 366/78; 366/82; 425/190; 425/382.4
[58] Field of Search ................................. 366/78–85, 89, 366/186, 194–196, 289, 318, 319; 425/190, 192 R, 382.4, 562, 563

[56] References Cited

U.S. PATENT DOCUMENTS

| | | | |
|---|---|---|---|
| 2,780,834 | 2/1957 | Bernhardt | 425/190 |
| 2,810,159 | 10/1957 | Teichmann | 425/190 |
| 3,002,229 | 10/1961 | Friedrich | 425/563 X |
| 3,452,398 | 7/1969 | Siegel | 425/192 |
| 3,728,053 | 4/1973 | Stillhard et al. | 425/562 X |
| 4,477,242 | 10/1984 | Eichlseder et al. | 425/562 X |

FOREIGN PATENT DOCUMENTS

| | | | |
|---|---|---|---|
| 57-98330 | 6/1982 | Japan | 425/562 |
| 1007140 | 10/1965 | United Kingdom | 366/89 |

*Primary Examiner*—Charles E. Cooley
*Attorney, Agent, or Firm*—Ira S. Dorman

[57] ABSTRACT

The disc screw extruder employs a free-floating operating member that is so constructed as to attain substantially stable axial positions within the extruder chamber. The disc component cooperates with confronting surfaces to define inner and outer throat zones, extending along the lead-in and lead-out sections of the disc component, the thicknesses of the flow paths through both of the throat zones decreasing in the outward direction of the extruder.

11 Claims, 3 Drawing Sheets

DISC SCREW EXTRUDER WITH FREE-FLOATING OPERATING MEMBER

BACKGROUND OF THE INVENTION

Disc screw extruders are in common use for processing a wide variety of materials, most typically synthetic resinous materials but also including food products, waste products, and the like. The screw component of the operating members of such machines serve to advance the charge of material to the disc component, where it is subjected to shear forces; the magnitude of the forces generated depend, to large measure, upon the dimensions and configuration of the flow paths formed between the confronting surfaces of the disc and the extruder body.

The prior art provides disc screw extruders in which the axial position of the operating member can be adjusted for variation of the effective size of the extrusion gap. Extruders are also known in which the operating member effects axial reciprocation as well as rotation, for enhanced working of the processed material.

Exemplary of prior art in this field are the following: French patent No. 1,559,634 provides an extruder in which the gap between the disc of the operating member and the adjacent, cavity-defining plate increases in a radially inward direction, while its flow cross section is maintained constant or diminishes slightly, so as to afford desirable levels of plasticization without overheating of the material. A disc screw extruder is disclosed in French patent application No. 2,204,495, in which the operating member is movable on its axis of rotation for effecting injection of the melt into an associated mold. Japanese patent publication No. 55-36497 provides a dual-effect symmetric extruder in which opposing screw components lead to the opposite sides of a common disc.

SUMMARY OF THE INVENTION

Despite the state of the art indicated by the foregoing, a need exists for a disc screw extruder of relatively simple design, which affords a high degree of stability in operation and a relatively long useful life, and it is therefore the broad object of the present invention to provide such an extruder. More specific objects of the invention are to provide a disc screw extruder which is self-adjusting for optimal extrusion of the material being processed, which requires no mechanical means for setting and maintaining flow path gaps, and in which the weight and complexity of bearing and support systems are reduced significantly.

It has now been found that the foregoing and related objects of the invention are attained by the provision of an extruder for processing thermoplastic materials, and the like, comprising a casing, an elongate operating member, rotary drive means, and coupling means. The casing has an elongate internal chamber comprised of screw and disc sections aligned on the longitudinal axis of the casing and in material-flow communication with one another. An intake opening into the screw section is defined adjacent an inner end of the chamber, and an outlet opening from the disc section is defined adjacent an outer end thereof. The operating member is coaxially mounted in the casing chamber for rotation about, and reciprocal movement on, its longitudinal axis; it includes a screw component and a disc component, both of generally circular transaxial cross section and being disposed, respectively, in the screw and disc sections of the casing chamber. The coupling means operatively connects the drive means to the operating member for effecting rotation of the operating member while permitting its free, limited axial reciprocation. The disc component has a central portion that is of substantially greater diameter than the screw component; a lead-in portion of the disc component extends from the screw component to the central portion thereof and is enlarged in the outward direction, and a lead-out portion extends from the central portion of the disc component toward the outlet opening and is diminished in the outward direction. The disc section of the casing chamber is defined by wall portions that are radially disposed to cooperate with the disc component of the operating member so as to form inner and outer throat zones which extend along the lead-in and lead-out portions of the disc component, respectively; the gap distances between the surfaces defining both throat zones vary at least incrementally (i.e., in at least two steps) and decrease in the outward direction of the extruder.

Generally, either or both of the lead-in and lead-out portions of the disc component will be comprised of a plurality of frustoconical sections, formed at angles that differ from one another. When the lead-in portion is so comprised, the angle at which any such section is formed will have a value that is lesser than that at which any more inwardly disposed frustoconical section is formed. The cooperating casing wall portions will also generally comprise a plurality of frustoconical sections, with the angle at which any such section defining (for example) the inner throat zone again having a value lesser than that at which any more inwardly disposed section is formed. The defining surfaces will, in any event, desirably lie substantially parallel to one another so as to render each throat zone section of substantially uniform thickness along its length.

Either or both of the lead-in and lead-out portions of the disc component, and the cooperating casing wall surface, may alternatively be comprised of a single conical section. The central portion of the disc component, and the wall portion of the casing that lies in general registry therewith, will desirably be of cylindrical transaxial cross section, and normally, the outlet opening from the disc section will be aligned on the longitudinal axis of the extruder.

DETAILED DESCRIPTION OF THE ILLUSTRATED EMBODIMENT

Figure 1:
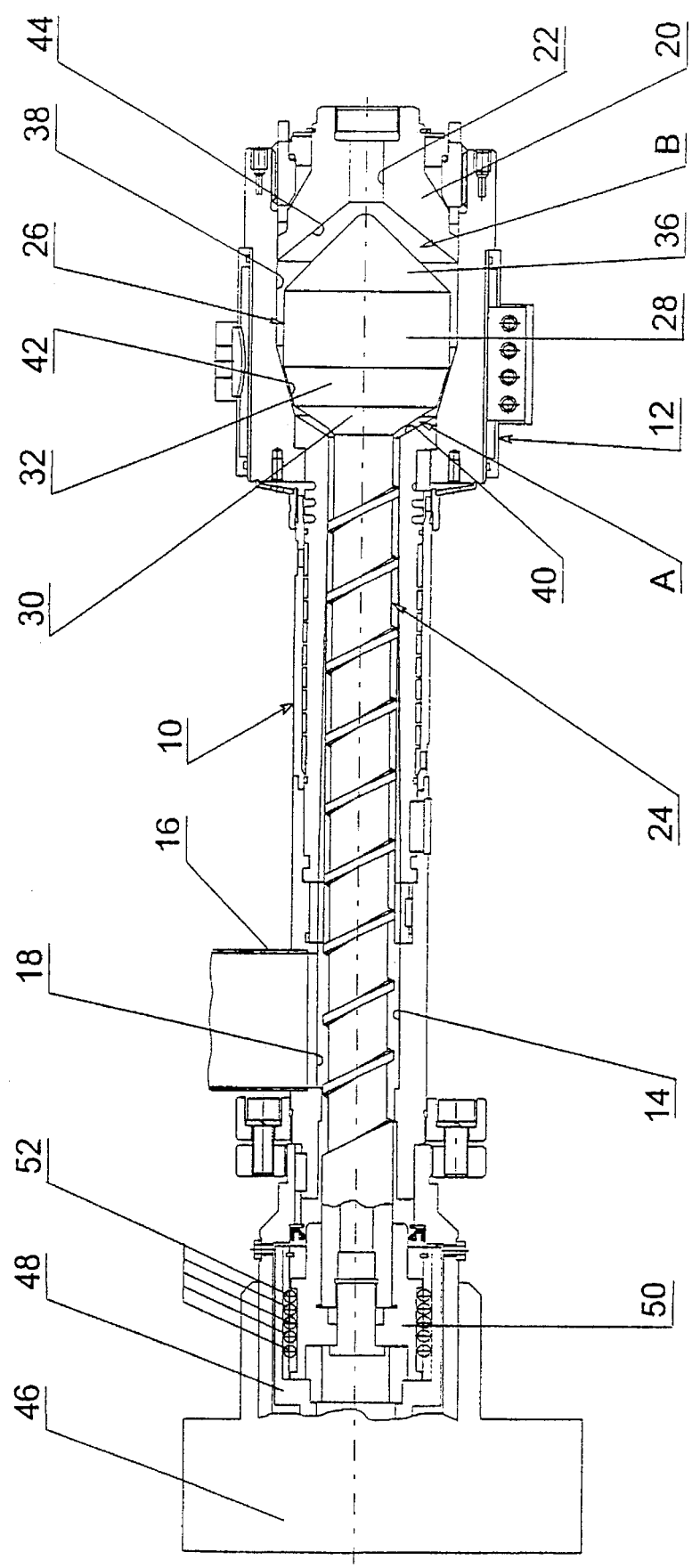
FIG. 1 of the drawings is a diagrammatic, sectional view of a disc screw extruder embodying the present invention.
Figure 2:
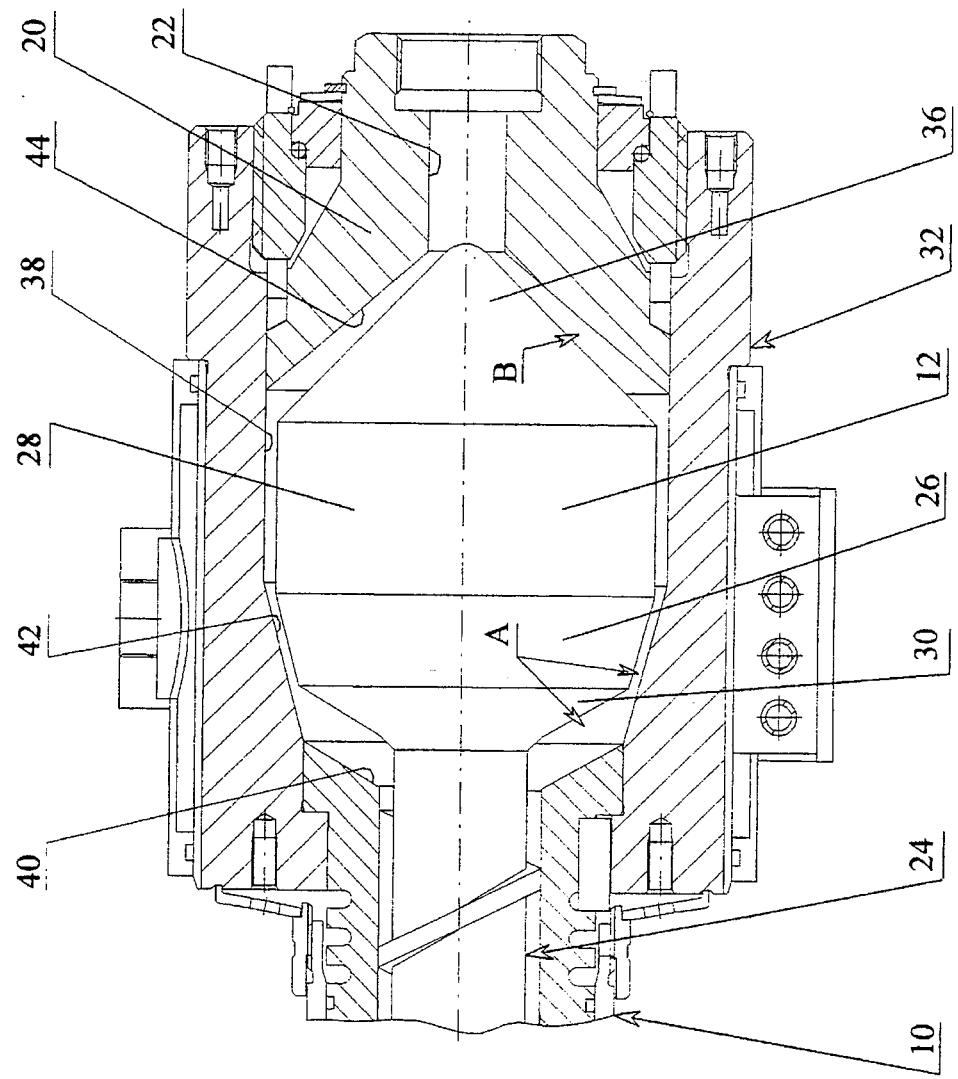
FIG. 2 is a fragmentary, diagrammatic sectional view of the forward portion of the extruder, drawn to an enlarged scale and showing the operating member axially displaced from the position depicted in FIG. 1.

Turning now in detail to the appended drawings, therein illustrated is a disc screw extruder embodying the present invention and including a casing composed of an elongate body portion, generally designated by the numeral 10, and a head portion generally designated by the numeral 12 and attached to the forward end of the body portion 10. A feed hopper 16 provides an inlet opening 18 through which the material to be processed is introduced, at the inner end of the chamber 14, and an insert 20 is mounted within the head portion 12 and defines an outlet opening 22 aligned on the longitudinal axis of the extruder.

The operating member comprises a screw component, generally designated by the numeral 24, and a disc component generally designated by the numeral 26, affixed to the forward end of the screw component 24. The disc component 26 has a cylindrical central portion 28 and a lead-in portion comprised of two frustoconical sections, 30 and 32; a third frustoconical section 36 extends outwardly from the cylindrical section 28 toward the opening 22. The innermost frustoconical section 30 provides a transition between the screw component 24 and the more outwardly disposed disc section 32, which in turn provides a transition to the cylindrical section 28; the surface of section 30 will typically form an angle of about 60° with the longitudinal axis of the operating member (taken in a plane including that axis), and the surface of the section 32 will typically form an angle of about 15° therewith. As will be appreciated, all of the disc component sections 28, 30, 32 and 36 are concentrically disposed on the longitudinal axis of the operating member.

The chamber of the head portion 12 is defined by internal surfaces 38, 40, 42 and 44, substantially aligned (in transaxial planes) with the sections 30, 32, 38 and 36 of the disc component 26, respectively. The angles at which the surfaces 38, 40, 42 and 44 are disposed correspond, at least generally, to the angles of the aligned surfaces of the disc component. More specifically, the surfaces of the sections 30 and 32 of the disc component 26 are parallel to the wall surfaces 40 and 42, respectively, thus defining channels that are of uniform thicknesses along their entire lengths. The surface 36 is disposed at an angle that is slightly smaller than that at which the surface 44 on the head insert 20 is disposed, thus defining a channel therebetween that tapers slightly (as viewed in axial planes) in the outward direction; typically, the surface 36 will be disposed at about 45° to the longitudinal axis, and the surface 44 will form an angle of about 50° therewith. As a result, both the inner throat zone, generally designated "A" and formed between the surfaces 30 and 40, and 32 and 42, and also the outer throat zone, generally designated "B" and formed between the surfaces 36 and 44, decrease in flow path thickness in the outward direction of the extruder.

Figure 3:
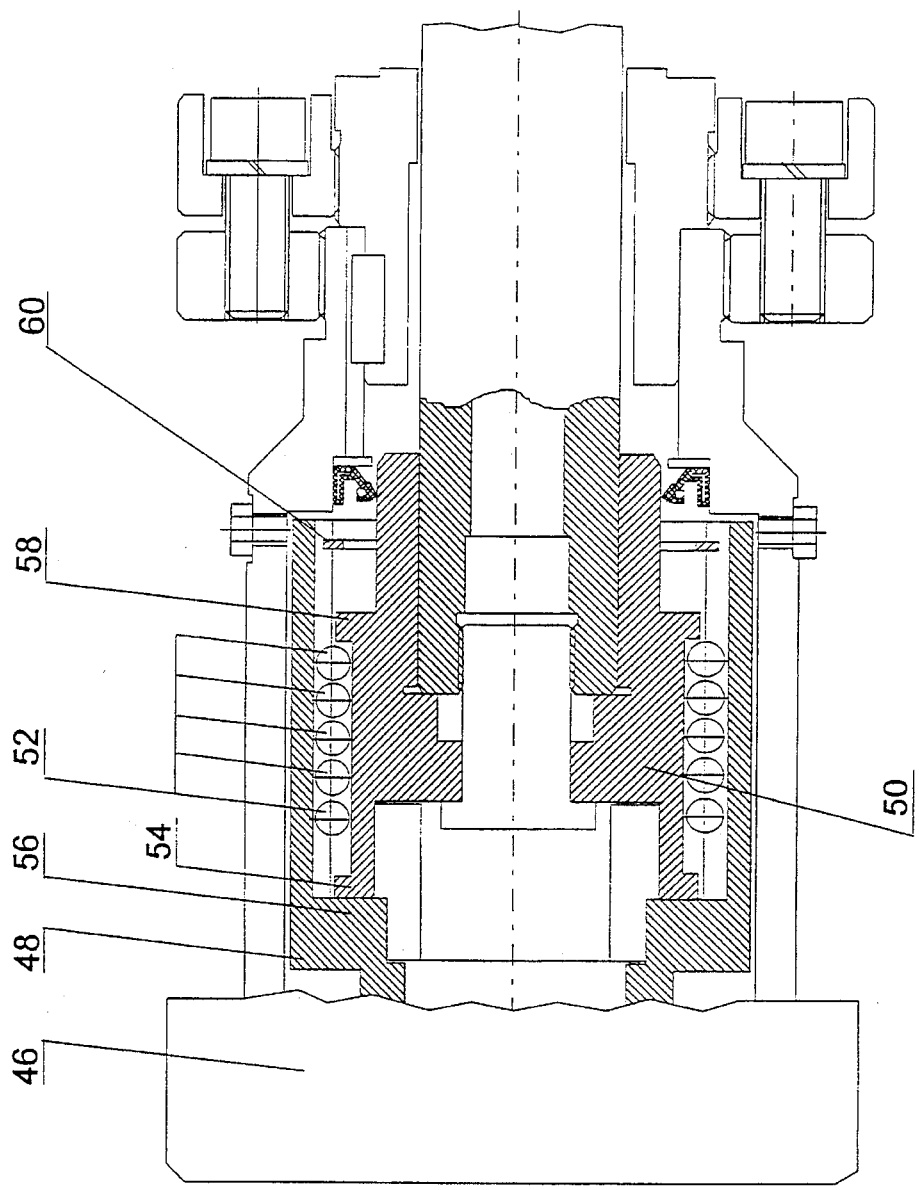
FIG. 3 is a fragmentary, diagrammatic sectional view of the rearward portion of the extruder, drawn to the scale of FIG. 2 and showing the operating member displaced to its rearward limit.

Gear box 46 contains gears for operatively connecting a motor so as to effect rotation of a drive shaft (none of which are shown), which in turn carries a coupling collar 48. A cooperating axle piece 50 extends from the inner end of the operating member screw component 24, and is telescopically engaged within the collar 48; the axle piece 50 and collar 48 are externally and internally longitudinally grooved, respectively, for seating therebetween a number of bearing elements 52. In the most rearward position of the operating member, the contact flange portion 54 of the axle piece 50 abuts against the shoulder portion 56 of the collar 48, as depicted in FIG. 3. In the most forward operating member position, the flange portion 58 of the axle piece 50 abuts against the internal snap ring 60. This arrangement fixes the collar 48 and axle piece 50 against relative rotation while permitting limited axial movement therebetween, thereby enabling the operating member to shift freely within the chamber of the extruder casing (to the limits of the coupling components 48, 50) while being rotated by the drive motor. It will be appreciated that the axial spatial relationships among the elements 54, 56, 58 and 60 will normally be such that some gap will be defined in both of the throat zones A and B in all positions to which the operating member can move, under the constraints imposed.

In operation, the material to be processed (e.g., polymer beads or pellets) is charged into the extruder through the hopper 16 and inlet opening 18, and is advanced by the screw component 24 from the inner end of the chamber 14 to the disc component 28 and ultimately through the outlet opening 22. Until the material reaches the disc zone, the free-floating operating member will tend to move reactively in the rearward direction (i.e., toward the feed opening 18), to the full extent permitted by the mechanical constraints of the coupling parts 48 and 50. As the material begins to enter the more inward (rearward) throat zone A, the pressures generated will tend to shift the operating member in the opposite direction (i.e., toward the outlet opening 22). Although the mechanical constraints are such as to prevent complete blockage of the opening 22 by the confronting conical portion 36 of the disc component 26, still the pressure that develops in the outer (forward) throat zone B will urge the operating member toward the inlet opening 18. In this way, the operating member will automatically seek an intermediate position within the extruder chamber at start up.

Variation of the equilibrium position of the operating member, upon continued operation of the extruder, will depend primarily upon the level of pressure that is generated at the extruder outlet 22, as can in turn be affected by variations in the size of the outlet opening, or by heating or cooling the extrudate. For example, cooling of the material in an attached die will increase back pressure on the operating member, thereby tending to decrease the gap distances in the throat zone A and simultaneously increase the gap distances in the throat zone B. Narrowing of the flow path will cause the material to be subjected to increased shear forces in the throat zone A, thereby elevating the temperature of the material and commensurately decreasing its viscosity. The material will therefore be delivered to the die at a higher temperature, ultimately enabling the operating member to resume its more forward position.

Conversely, if the temperature of the extrudate has become excessively elevated the reduced viscosity will permit the operating member to shift toward the outlet opening, thereby increasing the flow path cross section in the throat zone A and decreasing it in zone B. This will permit a build up of material in zone A, in turn causing it to be subjected to lower levels of shear thereat and hence to be heated at a reduced rate.

Just as the dynamic, automatic shifting that occurs in the operating member can be employed to maintain a selected extrudate temperature, so too can the temperature of the processed material be readily controlled by varying the size of the outlet opening 22. If for example it is desired to increase the temperature of the extrudate, it is merely necessary to reduce the size of the opening 22, increasing back pressure on the operating member and producing the elevated shear levels already described; the operating member would tend toward a new equilibrium position. As will be readily apparent, increasing the size of the outlet opening 22 will effect a reduction of the temperature of the extrudate.

It will be appreciated that many variations can be made in the construction and features of the extruder described without departure from the novel concepts of the invention. For example, and as has been pointed out hereinabove, the throat zones of the disc component may be comprised of either a single section or multiple sections, provided however that the zone defines a flow path that decreases in thicknesses in the outward direction. And although throat sections defined by rectilinear surfaces (taken in the axial section) have been described here-in-above, it will be appreciated that curvilinear surfaces may also be employed and may be advantageous in certain instances.

Thus, it can be seen that the present invention provides a novel disc screw extruder that is of relatively simple design, that is highly stable in operation, and that affords a relatively long useful life. The extruder is self-adjusting so as to achieve optimal extrusion of the material being processed, it requires no mechanical means for setting and maintaining flow path gap distances, and the weight and complexity of the bearing and support systems for the operating components are significantly reduced.

Having thus described the invention, what is claimed is:

1. An extruder for processing materials comprising:

a casing having an elongate internal chamber with screw and disc sections aligned on the longitudinal axis of said casing in material-flow communication with one another, said disc section lying outwardly of said screw section along said longitudinal axis, said casing defining an intake opening into said screw section, adjacent an inner end of said chamber, and an outlet opening from said disc section adjacent an outer end of said chamber;

an elongate operating member coaxially mounted in said casing chamber for rotation about, and reciprocal movement on, said longitudinal axis, said operating member including a material-advancing screw component and a disc component disposed, respectively, in said screw and disc sections of said casing chamber, said screw and disc components being of generally circular transaxial cross section;

rotary drive means; and coupling means operatively connecting said drive means and said operating member for effecting rotation of said operating member while permitting limited free axial reciprocation of said operating member in said chamber; said disc component including a central portion of substantially greater diameter than said screw component, a lead-in portion that is progressively enlarged in the axially outward direction, extending from said screw component to said central portion, and a lead-out portion that is progressively diminished in said outward direction, extending from said central portion toward said outlet opening; said disc section of said chamber being defined by wall portions of said casing that are spaced radially from said disc component of said operating member and that cooperate therewith to form inner and outer throat zones extending, respectively, along said lead-in and lead-out portions of said disc component, the gap distances between the surfaces defining both of said throat zones varying at least incrementally and decreasing in said outward direction of said extruder.

2. The extruder of claim 1 wherein at least one of said lead-in and lead-out portions of said disc component is comprised of a plurality of frustoconical sections formed at angles, taken with respect to said longitudinal axis, that differ from one another.

3. The extruder of claim 2 wherein said lead-in portion is comprised of said frustoconical sections, the angle at which any said frustoconical section is formed having a value lesser than that at which any more inwardly disposed said frustoconical section is formed.

4. The extruder of claim 1 wherein said casing wall portions, cooperatively forming at least one of said inner and outer throat zones, comprise a plurality of frustoconical sections formed at angles, taken with respect to said longitudinal axis, that differ from one another.

5. The extruder of claim 4 wherein said casing wall portions forming said inner throat zone comprise said frustoconical sections, the angle at which any said frustoconical section is formed having a value lesser than that at which any more inwardly disposed said frustoconical section is formed.

6. The extruder of claim 1 wherein at least one of said lead-in and lead-out portions, as well as said casing wall portion that cooperatively forms one of said throat zones therewith, comprises a plurality of frustoconical sections formed at angles, taken with respect to said longitudinal axis, that differ from one another to provide a plurality of throat zone sections, the surfaces of said disc component and casing wall portions defining each of said throat zone sections lying substantially parallel to one another so as to render each of said throat zone sections of substantially uniform thickness along its length.

7. The extruder of claim 1 wherein at least one of said lead-in and lead-out portions is comprised of a single conical section.

8. The extruder of claim 7 wherein said casing wall portion that cooperatively defines a throat zone with said at least one portion is also comprised of a single conical section.

9. The extruder of claim 1 wherein said central portion of said disc component is of cylindrical transaxial cross section.

10. The extruder of claim 9 wherein one of said wall portions of said casing, in general registry with said central portion of said disc component, is of generally cylindrical transaxial cross section.

11. The extruder of claim 1 wherein said outlet opening is aligned on said axis of said casing.

* * * * *